United States Patent
Mie et al.

(10) Patent No.: US 7,824,166 B2
(45) Date of Patent: Nov. 2, 2010

(54) INSTALLATION FOR BLOW-MOLDING HOLLOW BODIES

(75) Inventors: Patrick Mie, Octeville sur Mer (FR); Denis Souffes, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 517 days.

(21) Appl. No.: 11/946,166

(22) Filed: Nov. 28, 2007

(65) Prior Publication Data
US 2008/0124424 A1    May 29, 2008

(30) Foreign Application Priority Data
Nov. 28, 2006   (FR) .................... 06 10417

(51) Int. Cl.
*B29C 49/58* (2006.01)
(52) U.S. Cl. .................... 425/182; 425/529; 425/535
(58) Field of Classification Search .................... 425/182, 425/529, 535
See application file for complete search history.

(56) References Cited

U.S. PATENT DOCUMENTS 5,169,705 A    12/1992    Coxhead et al.
6,769,895 B2 *    8/2004    Derouault et al. ............ 425/535
2008/0286402 A1 *    11/2008    Mie ............................ 425/525

FOREIGN PATENT DOCUMENTS

| EP | 0437381 A1 | 7/1991 |
|---|---|---|
| EP | 1529620 A1 | 5/2005 |
| WO | WO 01/53063 A1 | 7/2001 |

* cited by examiner

*Primary Examiner*—Robert B Davis
(74) *Attorney, Agent, or Firm*—Sughrue Mion, PLLC (57) ABSTRACT

The present invention relates to a blow-molding installation for manufacturing thermoplastic hollow bodies by blow-molding or stretch-blow-molding containers (37) in a molding cavity of a mold, this blow-molding installation comprising a double-acting nozzle actuator (1) with two stages in series, equipped with two pistons (5, 6), these being an upper piston and a lower piston respectively, the nozzle (15, 16) being fixed removably, and pneumatic control means being designed to make said pistons (5, 6) slide according to a first operating mode used when the nozzle (15) is of the type that makes sealed contact with the mouth of the neck of the container, and a second operating mode used when the nozzle (16) is of the bell type with sealed contact against the surface of the mold in which the container (37) is placed.

9 Claims, 4 Drawing Sheets

INSTALLATION FOR BLOW-MOLDING HOLLOW BODIES

TECHNICAL FIELD

The subject of the present invention is installations for blow-molding hollow bodies in a blow-molding mold that make it possible, starting from preheated hollow bodies made of thermoplastic such as PET, to obtain containers such as various types of bottle.

BACKGROUND ART

More specifically, the invention relates to a blow-molding installation for manufacturing thermoplastic hollow bodies by blow-molding or stretch-blow-molding containers in a molding cavity of a mold, this blow-molding installation comprising a nozzle actuator comprising at least one moving nozzle piston, a nozzle able to establish a sealed fluidic connection with the neck of a container placed in the molding cavity, and pneumatic means for operating the actuator between a raised position in which the nozzle is raised above the mold and a blow-molding position in which the nozzle makes a sealed fluidic connection with the neck of a container placed in the molding cavity.

The expression "hollow body" is to be understood as meaning any hollow element which, when heated and blow-molded or stretch-blow-molded, is able to form a container and has a body part and a neck part, the neck having already been produced to the definitive shape and size of the neck of the container. A hollow body is therefore either a preform prior to the first blow-molding or stretch-blow-molding step, or an intermediate container which has already undergone a blow-molding or stretch-blow-molding operation and, having been reheated, needs to be blow-molded or stretch-blow-molded again.

There are two types of blow-molding nozzles commonly used for performing this blow-molding operation once the hollow body has been placed in the mold with the neck projecting from the mold.

A first type of nozzle commonly used is, as illustrated in FIG. 7 of document FR 2 790 704, a nozzle able to create sealed contact with the mouth of the neck of the hollow body, that is to say a nozzle having a blow-molding tube of which the free end, usually termed the "nozzle orifice" is able to collaborate sealingly with the mouth of the neck. In general, the nozzle orifice has a frustoconical external shape and the diameter at the base of the cone frustum is smaller than that of the opening of the neck thus allowing the blow-molding tube of the nozzle to be introduced into the neck. Because of the increase in diameter of the frustoconical section, contact is made between the cone frustum and the interior peripheral edge of the mouth of the neck of the preform, thus establishing sealed contact between the neck and the nozzle during the blowing operation. Alternatively, the end of the nozzle has an external shoulder against which the mouth of the neck of the preform bears, thus making it possible to establish sealed contact between the neck and the shoulder of the blowing tube of the nozzle. In this case, the free end of the blowing tube may be made substantially cylindrical. Nozzles of the type which establish sealed contact with the mouth are, in practice, given preference in the manufacture of heat-resistant containers intended to contain hot-filled liquids.

A second type of nozzle also commonly used is termed the "bell nozzle", particularly like the one described in document FR 2 764 544 or also illustrated in FIG. 1 of document FR 2 790 704. A bell nozzle comprises a tube with a blowing end surrounded by a skirt. When the nozzle is in the blow-molding position, the bell-shaped end of the nozzle caps the neck of the preform, the skirt then bearing sealingly against the upper surface of the mold. Bell-type nozzles are, in practice, given preference in the manufacture of containers intended to contain carbonated liquids.

To allow the nozzles to be lowered toward the necks of the preforms and to form a sealed fluidic connection between the neck of the preform and the end of the blowing tube, either directly by the end of the blowing tube bearing on and/or being inserted in the neck when using a nozzle of the type which makes sealed contact with the mouth, or indirectly when using a nozzle of the bell type, each type of nozzle is associated with a respective one of two types of actuator, the structures and operating modes of which are determined according to the type of nozzle. It is therefore necessary to modify a large proportion of the blow-molding installation when switching from the manufacture of one type of container to the manufacture of containers of the other type.

To do this, relatively lengthy conversion operations have to be performed on the blow-molding installation. Specifically, the nozzle actuators have then to be disconnected, the actuators have to be exchanged, other actuators need to be connected with the new nozzles and then the new actuator operating mode needs to be initialized for the new container manufacturing run.

In molding installations of the rotary carousel type equipped with a great many molds (several tens of molds, typically of the order of twenty to forty molds), these connecting/disconnecting/initializing operations prove to be particularly lengthy, and therefore expensive, while at the same time requiring the participation of qualified staff.

It would therefore be particularly advantageous to use means that allow the blow-molding installation to be adapted in the swiftest possible length of time, easily, using simple mechanical means and without involving reinitializing the actuator operating mode.

The present invention proposes to solve these problems associated with the prior art.

SUMMARY OF THE INVENTION

The present invention relates to a blow-molding installation for manufacturing thermoplastic hollow bodies by blow-molding or stretch-blow-molding containers in a molding cavity of a mold, this blow-molding installation comprising:
  a nozzle actuator comprising at least one moving nozzle piston;
  a nozzle able to establish a sealed fluidic connection with the neck of a container placed in the molding cavity; and
  pneumatic means for operating the actuator between a raised position in which the nozzle is raised above the mold and a blow-molding position in which the nozzle makes a sealed fluidic connection with the neck of a container placed in the molding cavity.

In order to make it possible to produce an installation capable of operating in two operating modes, the installation according to the invention is characterized in that the nozzle actuator is a double-acting actuator with two stages in series equipped with two pistons, these being an upper piston and a lower piston respectively; in that the nozzle is fixed removably on the free end of the lower piston; and in that the pneumatic control means are designed to make said pistons slide according to two operating modes, namely a first operating mode used when the nozzle is of the type that makes sealed contact with the mouth of the neck of the container, and a second operating mode used when the nozzle is of the bell type with sealed contact against the surface of the mold in which the container is placed.

More specifically, and from a structural standpoint, the actuator, of central axis X-X, comprises an upper piston able to come into abutment against an upper shoulder and a lower piston able to come into abutment against a lower shoulder, the stroke of the lower piston being longer than the stroke of the upper piston, the actuator being in the form of a cylinder having an upper radial port, an intermediate radial port and a lower radial port, the intermediate radial port lying in the same radial plane as the upper shoulder and the lower radial port lying in the same radial plane as the lower shoulder.

Alternatively, the actuator of central axis X-X comprises an upper piston able to come into abutment against an upper shoulder and a lower piston able to come into abutment against a rim of a cap via a ring surrounding the pin of the lower piston.

Again alternatively, the actuator of central axis X-X comprises an upper piston able to come into abutment against an upper shoulder and a lower piston able to come into abutment against the surface of the mold.

To allow the nozzle to be secured to and disconnected from the actuator quickly, the nozzle of the type that makes sealed contact with the mouth and the nozzle of the bell type are fixed to the actuator by screw-thread means consisting of a screw thread provided on the actuator and of a tapped bore provided in the nozzle of the type that makes sealed contact with the mouth and in the nozzle of the bell type.

According to one possible way in which the actuator pistons are controlled, the control means are configured to, in succession:

simultaneously lower the upper and lower pistons until the upper piston comes into abutment against the upper shoulder by injecting a pressurized fluid into the upper radial port;

lower the lower piston by injecting a pressurized fluid into the intermediate radial port;

raise the lower piston until it comes into abutment against the lower edge of the upper piston by injecting a pressurized fluid into the lower radial port, the lower piston remaining resting against the upper shoulder; and simultaneously raise the upper and lower pistons until the upper piston comes to rest against the end wall of the actuator by injecting a pressurized fluid into the lower radial port.

According to another possible way of operating the actuator according to the invention, the control means are configured to, in succession:

lower the lower piston until it comes into abutment with the surface of the mold by injecting pressurized fluid into the intermediate radial port, the upper piston remaining resting against the end wall of said actuator, and raise the lower piston until it comes into abutment against the lower edge of the upper piston by injecting pressurized fluid into the lower radial port, the upper piston remaining against the end wall of said actuator.

BRIEF DESCRIPTION OF THE DRAWINGS

The present invention is now described with the aid of some entirely illustrative examples which do not in any way limit the scope of the present invention, and on the basis of the attached figures in which.

DESCRIPTION OF THE PREFERRED EMBODIMENT OF THE INVENTION

Figure 1:
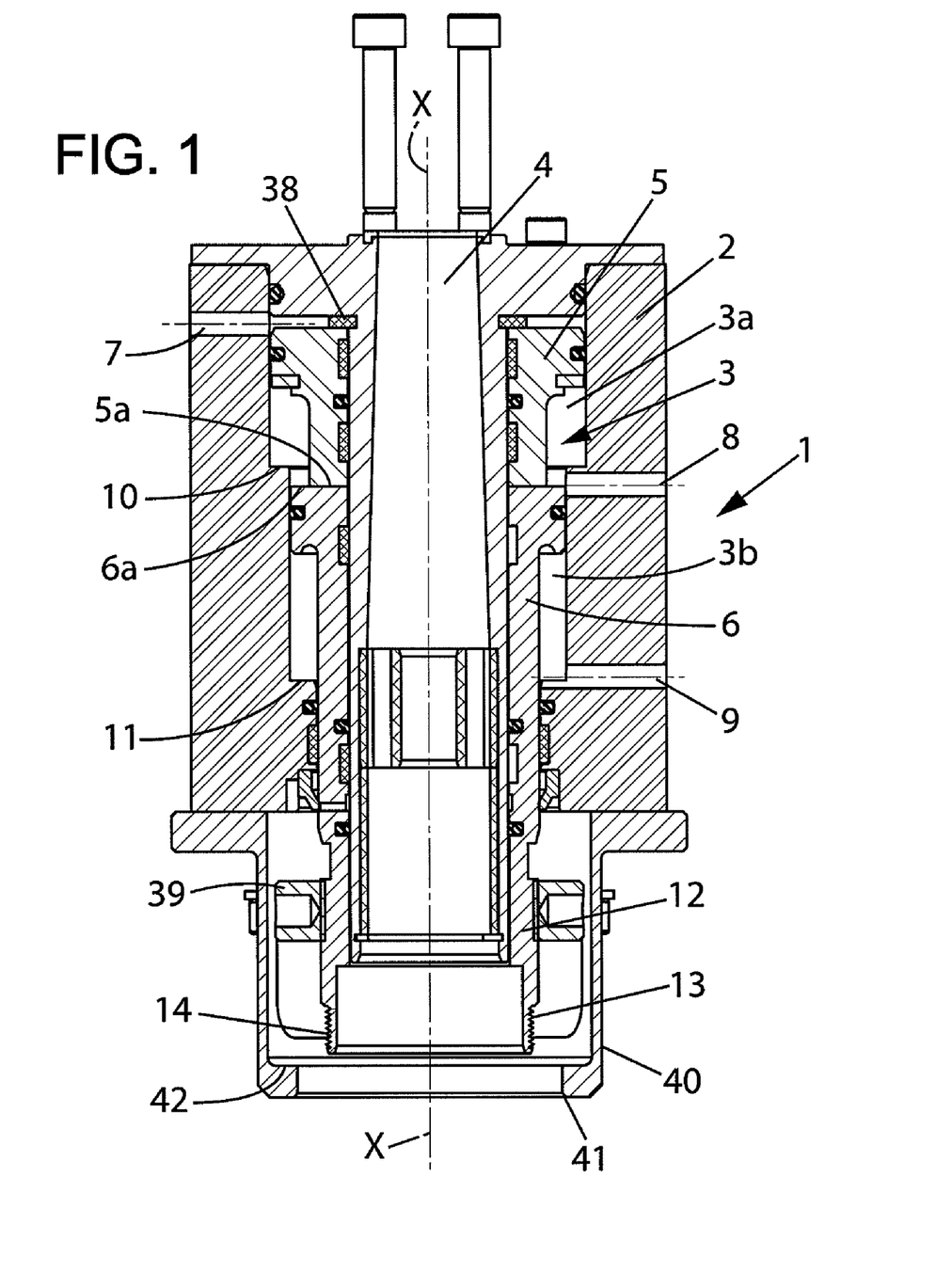
FIG. 1 is a schematic sectional view of a nozzle actuator according to the invention.

FIG. 1 depicts a sectional view of a nozzle actuator 1 of central axis X-X in the form of a cylinder 2 with a double internal bore 3 and an axial tubular body 4.

The nozzle actuator 1 comprises at least one moving nozzle piston (5, 6) and, more specifically, is of the double acting type with two stages in series equipped with two pistons (5, 6), that is to say that it has a first piston 5 known as the "upper" piston and a second piston 6 known as the "lower" piston, these coaxially aligned pistons (5, 6) being able to slide internally inside the double internal bore 3 made up of an upper large internal bore 3a and of a lower small internal bore 3b, on the external periphery of the tubular body 4.

In the remainder of the description, it must be understood that the terms "upper", "lower", "upward", "downward", "raised" and "lowered" are used with reference to the layout of the elements as depicted in the figures. Thus, these terms are used merely for clarity and must not be interpreted as limiting the scope of the invention.

The upper piston 5 is of size such that it is able to come into contact via its lower edge 5a with the upper edge 6a of the lower piston 6.

The cylinder 2 has three radial ports: an upper radial port 7, an intermediate radial port 8 and a lower radial port 9. The upper radial port 7 is advantageously connected to means for injecting fluid, for example of the compressed air type, so that when this fluid is injected into the upper radial port 7, it causes the upper and lower pistons (5, 6) to slide simultaneously in a downward axial movement, that is to say in a downwardly directed movement toward the mold and the hollow body (neither of which is depicted in FIG. 1 but which are of types known per se).

The upper and lower pistons (5, 6) are able to come into abutment with upper and lower shoulders (10, 11) respectively provided in the interior wall of the axial internal aperture (3) in their downward axial sliding. Advantageously, the stroke of the lower piston 6 is longer than the stroke of the upper piston 5.

The lower shoulder 11 lies substantially in the same radial plane as the lower radial port 9 and the upper shoulder 10 advantageously also lies in substantially the same radial plane as the intermediate radial port 8.

The lower radial port 9 is connected to fluid-injection means (not depicted in the figures for clarity, but of a type known per se) which, when a fluid is injected through this lower radial port 9, allow the lower piston 6, and possibly the upper piston 5, to be made to slide vertically in an upward movement, that is to say in a direction away from the mold and the hollow body.

Likewise, the intermediate radial port 8 is also connected to fluid-injection means (not depicted in the figures for clarity, but of a type known per se) which, when a fluid is injected through this intermediate radial port 8, allow the lower piston 6 to be made to move downward once the upper piston 5 is in abutment against the upper shoulder 10, the upper radial port 7 being closed and the lower radial port 9 being open.

Thus, through the controlled injection of pressurized fluid into the ports (7, 8, 9) of the actuator 1 from fluid-injection means of a type known per se, such as multi-way pneumatic directional control valves, it is possible:

when fluid is injected through the upper port 7, to make the two pistons (5, 6) slide downward until the upper piston 5 comes into abutment against the upper shoulder 10, the intermediate and lower radial ports (8, 9) both being open. In this instance, because the stroke of the lower piston 6 is longer than the stroke of the upper piston 5, the lower piston 6 does not come into abutment against the lower shoulder 11;

when fluid is injected through the intermediate port 8, to lower the lower piston 6 once the upper piston 5 is in abutment against the upper shoulder 10, the upper radial port 7 being closed and the lower radial port 9 being open, and when fluid is injected through the lower radial port 9, to slide either both the upper and lower pistons (5, 6) upward if the fluid is injected at a sufficiently high pressure, the intermediate and upper radial ports (7, 8) being open, or just the lower piston 6 upward until the upper edge 6a of the lower piston 6 comes into abutment against the lower edge 5a of the upper piston 5, the upper piston 5 remaining in abutment against the upper shoulder 10, the intermediate radial port 8 then being open and the upper radial port 7 closed.

The lower piston 6 advantageously has a tubular lower part 12 which constitutes the pin 12 of the actuator 1, with a free end 13 in the shape of an annulus which, on its external periphery, has a screw thread 14.

Figure 2:
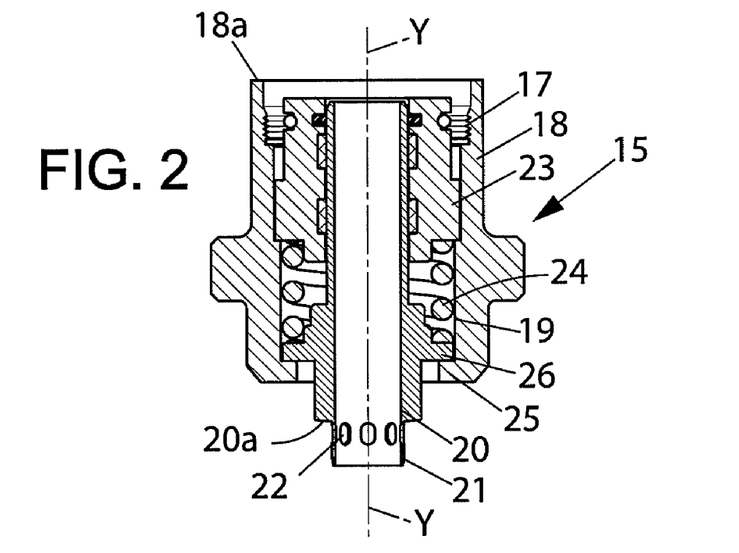
FIG. 2 is a schematic sectional view of a nozzle of the type which makes sealed contact with the mouth.
Figure 3:
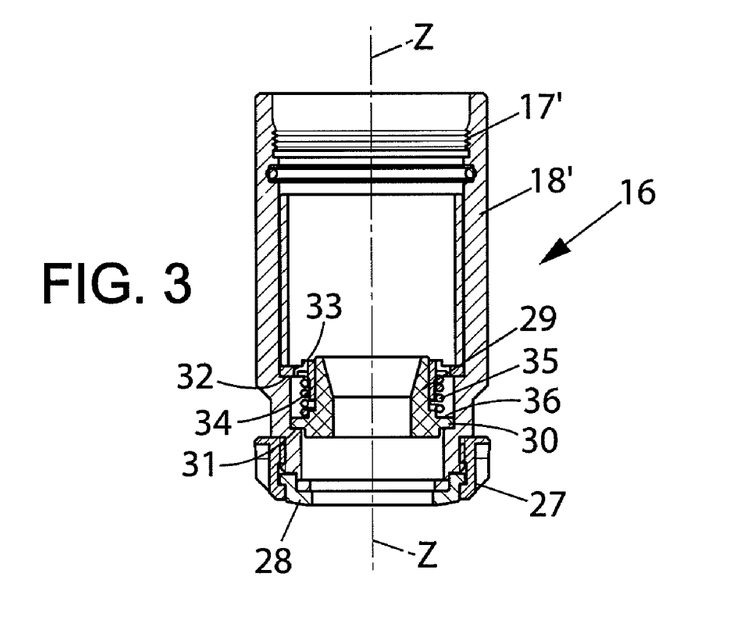
FIG. 3 is a schematic sectional view of a nozzle of the bell type.

Thus, the nozzle actuator 1 has a pin 12 with a threaded end 13 which can be screwed into and combined with either a nozzle 15 of the type which makes sealed contact with the mouth, as illustrated in FIG. 2, or a nozzle 16 of the bell type, as illustrated in FIG. 3.

Specifically, the nozzle 15 of the type which makes sealed contact with the mouth has a tapped internal bore 17 able to fit onto the external screw thread 14 of the annulus 13 of the actuator 1.

The nozzle (15, 16), supported removably at the free end 13 of the lower piston 6, is thus able to establish a sealed fluidic connection with the neck of a container placed in the molding cavity of a mold.

In general, the nozzle 15 of the type which makes sealed contact with the mouth is in the form of a sleeve body 18 of central axis Y-Y having an internal bore 19 through which there passes axially a blow-molding tube 20 with a shoulder 20a and a cylindrical free end 21, having a plurality of slots 22 of the vent type positioned substantially in one and the same radial plane.

The blow-molding tube 20 passes through a fixed cylindrical ring 23 provided in the sleeve body 18 of the nozzle 15 of the type which makes sealed contact with the mouth.

The interior volume of the annulus 13 of the actuator 1 is of a shape that complements the shape of the cylindrical ring 23 so that the cylindrical ring 23 can be held in the annulus 13 and a sealed connection can be made between the nozzle 15 of the type that makes sealed contact with the mouth, and the actuator 1.

More specifically, because of the presence of the tapped thread 17 on a part of the interior periphery of the internal bore 19 of the body of the sleeve 18, the nozzle 15 can be secured to the pin 12 of the actuator 1. Thus, vertical sliding of the lower piston 6 also causes vertical movement of the sleeve body 18 of the nozzle 15 of the type that makes sealed contact with the mouth. Because of this connection, the central axis X-X of the actuator 1 therefore coincides with the central axis Y-Y of the nozzle 15.

Spring means 24 are provided between the cylindrical ring 23 and the tube 20 of the nozzle 15 of the type that makes sealed contact with the mouth. More specifically, the sleeve body 18 has a lower rim 25, directed radially toward the central axis Y-Y of the nozzle 15 of the type that makes sealed contact with the mouth, and against which there butts a disk 26 that forms a swirling of the material of the blow-molding tube 20 under the thrust of the spring 24. Because of the tensile force exerted by the spring means 24 between the fixed cylindrical ring 23 and the disk 26 of the blow-molding tube 20, a given separation is maintained between these two elements (23, 26) at rest, when the tube 20 is not under tension or resting against the neck of the hollow body. The spring means 24 also make it possible to keep the tube 20 and the hollow body resting elastically against one another in spite of the blow-molding tension which, on inflation, tends to lift the tube 20.

Advantageously, the tube that elongates or stretches the hollow body during the blow-molding operation is able to pass through the blowing tube 20.

FIG. 3 depicts a schematic sectional view of a nozzle 16 of the bell type also able to be secured via a tapped internal bore 17' to the nozzle actuator 1.

The nozzle 16 of the bell type is in the overall shape of a sleeve body 18' of central axis Z-Z with a lower end 27 in the form of a skirt or annulus to which a lip seal 28 is attached to provide sealing during the blowing operation. More specifically, during the blowing operation, the skirt 27 is able to cap the neck of a hollow body resting on and projecting from the mold.

The nozzle 16 of the bell type comprises a bearing ring 29 provided internally in the sleeve body 18' and axially mobile.

The bearing ring 29 has an annular projection 30 able to butt against a lower first step 31 provided internally at the periphery of the sleeve body 18'.

An upper second step 32 is also provided inside the sleeve body 18' and against which an annular ring 33 comprising a cylindrical wall 34 running substantially axially is immobilized in the axial direction.

Spring means 35 are positioned surrounding the cylindrical wall 34 and bearing against the annular projection 30 and the annular ring 33.

The central aperture of the bearing ring 29 allows the engagement of a lengthening rod the purpose of which is to lengthen and stretch the hollow body in the mold cavity during the blow-molding operation.

Unlike the nozzle 15 of the type which makes sealed contact with the mouth, the lower rim 36 of the bearing ring 29 is not inserted in the neck of the hollow body but bears against the mouth of the hollow body in such a way as to hold the hollow body firmly in position and, more specifically, to press the flange of the hollow body against the upper surface of the mold.

Because of the presence of the spring means 35, it is possible, when pressing the lower rim 36 of the bearing ring 29 against the mouth of the hollow body, to have a slight contraction of the spring means 35 (namely a reduction in the separation between the annular projection 30 and the annular ring 32) so that an axial force can be exerted on the mouth of the hollow body and making it possible to guarantee that the flange is pressed firmly against the upper surface of the mold.

When securing the nozzle actuator 16 of the bell type to the actuator 1, the central axis X-X of the actuator 1 substantially coincides with the central axis Z-Z of the nozzle 16 of the bell type.

The dimensions of the actuator 1, particularly the dimensions of its screw thread 14, are such that the nozzle 15 of the mouth type and the nozzle 16 of the bell type can both fit and screw onto the same nozzle actuator 1 and are therefore directly interchangeable on the same actuator 1.

The nozzle actuator 1 is advantageously connected to pneumatic control means of a type known per se for controlling the injection of fluids into the ports (7, 8, 9) of the nozzle actuator 1 and thus altering the mode of operation of the actuator 1.

Indeed, although it is necessary to modify the mode of operation of the nozzle actuator 1 according to the type of nozzle (15, 16) fixed to the actuator 1 and therefore according to the type of container or bottle to be blow-molded, the control means according to the invention are identical whether the actuator 1 is associated with a nozzle 15 of the type that makes sealed contact with the mouth or a nozzle 16 of the bell type.

More specifically, the pneumatic control means for controlling the actuator 1 are able to control the actuator 1 between a position in which the nozzle (15, 16) is raised above the mold and a blow-molding position in which the nozzle (15, 16) makes a sealed fluidic connection either between the neck of the hollow body and the nozzle 15 or between the mold in which the hollow body is placed and the nozzle 16.

Figure 4:
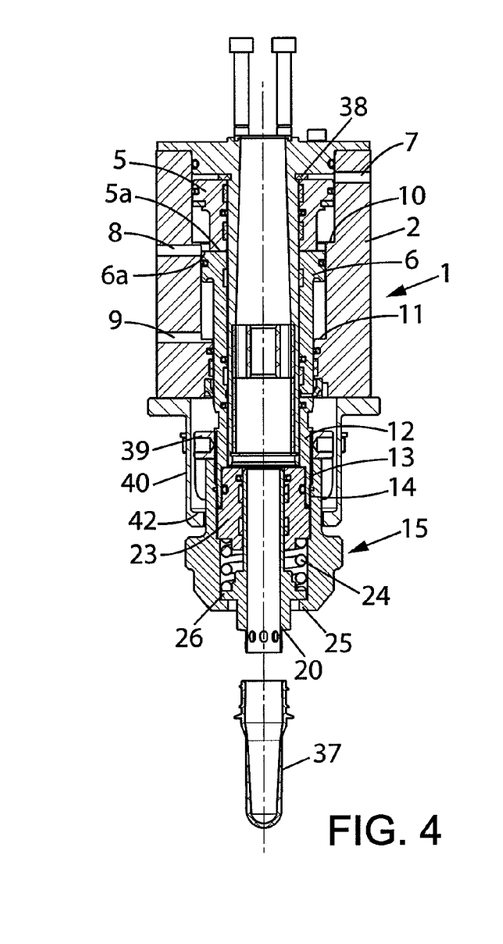
FIGS. 4 to 6 are schematic sectional views depicting three successive steps in the blow-molding method using a nozzle actuator associated with a nozzle of the type that makes sealed contact with the mouth.
Figure 5:
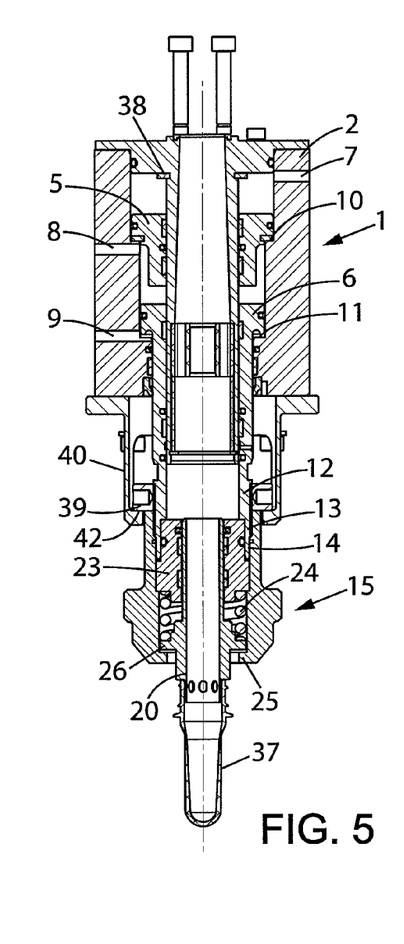
Figure 6:
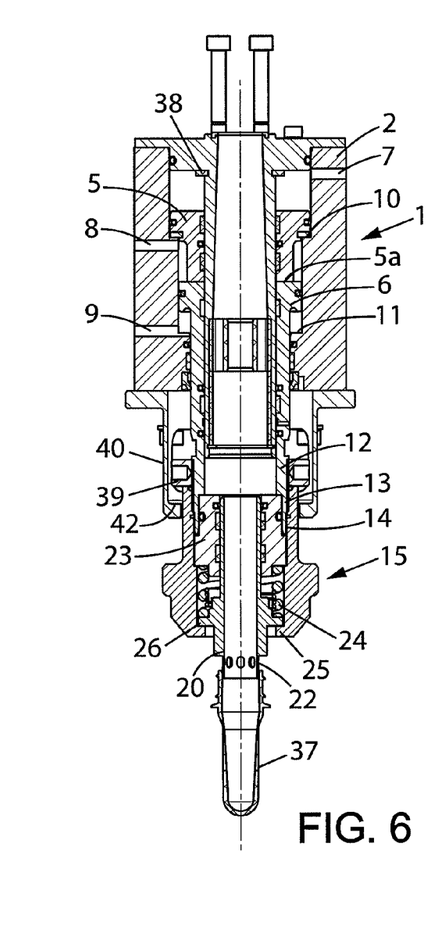

FIGS. 4 to 6 depict three successive steps in the operation of blow-molding, possibly with stretching, a hollow body 37 using a nozzle 15 of the type that makes sealed contact with the mouth.

For reasons of clarity, FIGS. 4 to 8 do not depict the mold, of a type known per se, on which the flange of a hollow body 37 bears during the blow-molding and/or stretch-blow-molding operation.

FIG. 4 depicts a schematic sectional view of a nozzle 15 of the type that makes sealed contact with the mouth prior to the operation of blow-molding, and possibly stretching, the hollow body 37.

In this position, the upper and lower pistons (5, 6) are both in a so-called "raised" position and can move only downward.

Thus, the lower piston 6 rests against the lower edge 5a of the upper piston 5, the upper piston 5 itself resting against a thrust washer 38 surrounding the tubular body 4 of the actuator 1. The washer 38 is advantageously provided in the end wall of the actuator 1 substantially in the same radial plane as the upper radial port 7.

In order to make the two pistons (5, 6) slide downward, a fluid is injected through the upper radial port 7 to cause the upper and lower pistons (5, 6) to slide downward. The upper piston 5 then comes into abutment against the upper shoulder 10, the lower piston 6 remaining resting against the lower rim 5a of the upper piston 5. Because of the difference in stroke between the pistons (5, 6), in order to cause the lower piston 6 to move downward until the ring 39 comes into abutment against the lower rim 42 of the cap 40, the upper radial port 7 has then to be closed, the lower radial port 9 opened then a pressurized fluid injected through the intermediate radial port 8. The pistons (5, 6) are therefore moved downward in two phases.

The pistons (5, 6) are then in the position as depicted in FIG. 5, that is to say in a so-called "lowered" position.

The lowering of the two pistons (5, 6) also causes the nozzle 15 of the type that makes sealed contact with the mouth to be lowered because the lower piston 6 is secured to the nozzle 15 by the screw thread 14 of the annulus 13 screwed onto the bore 17 of the nozzle 15.

In order to avoid crushing the neck of the hollow body 37 when creating the sealed contact between the blow-molding tube 20 and the neck, the rates of sliding of the pistons (5, 6) are controlled in such a way that the rate of sliding of the lower piston 6, when it is lowered from a position in which its upper rim 6a is in contact with the lower edge 5a of the upper piston 5 into a position in which it is resting against the mouth, does not cause crushing or deformation of the neck as it comes into contact with the shoulder 20a of the blow-molding tube 20.

Thus, the rates at which the two pistons (5, 6) are lowered until the upper piston 5 comes to rest against the upper shoulder 10 can be fixed by control means at a higher value than the rate at which the lower piston 6 descends.

Once a nozzle (15, 16) has been fixed and secured to the actuator 1, the upper rim 18a of the sleeve body 18 of the nozzle (15, 16) is in abutment against a guide ring 39 provided around the tubular lower part 12 of the lower piston 6.

The guide ring 39 is designed to slide in a cylindrical cap 40 coaxial with the cylinder 2 of the actuator 1 and having a substantially cylindrical lower aperture 41 of a diameter substantially equal to the diameter of the nozzle (15, 16) and having a radially directed lower rim 42.

Thus, as the lower piston 6 slides, the guide ring 39 also slides in the cap 40.

The distance between the guide ring 39 and the lower rim 42 can be used to set the length of the stroke of the lower piston 6.

In addition, the axial length of the nozzle 15, 16 can also be used to set the length of the stroke needed for the lower piston 6. The guide ring 39 does not therefore have to come into abutment against the lower rim 42 of the cap 40.

As an alternative, the guide ring 39 is a lock nut able to clamp the sleeve body (18, 18') by way of the screw thread 14 to which the nozzle (15, 16) is fixed, thus strengthening the attachment between the actuator 1 and the nozzle (15, 16).

As the two pistons (5, 6) are lowered and when the actuator 1 is secured to a nozzle 15 of the type that makes sealed contact with the mouth, the free end of the blow-molding tube 20 is inserted in the neck of the hollow body 37 as a result of the lowering of the blow-molding tube 20 by a distance corresponding to the distance over which the lower piston 6 slides in the internal aperture 3 of the sleeve body 2 of the actuator 1. The blow-molding tube 20 then rests elastically and sealingly via its shoulder 20a against the upper edge of the neck of the hollow body 37 and the guide ring 39 rests on the lower rim 42 of the cap 40.

It is within the competence of those skilled in the art to adapt the distance between the free end of the blow-molding tube 20 and the neck of the hollow body 37 placed in the mold to suit the distance through which the lower piston 6 slides in order thus to cause the tube 20 to bear elastically and sealingly against the neck of the hollow body 37.

Thereafter, the operation of blow-molding the hollow body 37 can then take place. After this blow-molding operation, in order to discharge the blowing air and vent the pressurized fluid blown into the hollow body 37, it is necessary to raise the blow-molding tube 20 partially with respect to the neck of the hollow body 37 so that the blowing fluid can be discharged through the plurality of slots 22 of the vent type provided at the end of the blow-molding tube 20.

To allow for this venting, a fluid is injected into the lower radial port 9 at a pressure such that the lower piston 6 experiences only an upward vertical sliding so that it then comes into abutment against the lower edge 5a of the upper piston 5, the upper piston 5 remaining in position in abutment against the upper shoulder 10. During this upward movement, in order to prevent the upper piston 5 from also moving upward, a fluid is injected into the upper radial port 7 and the intermediate radial port 8 is opened, thus causing a sliding only of the lower piston 6.

The slots 22 of the vent type are advantageously provided at such a distance from the lower edge of the free end of the blow-molding tube 20 that they are able to vent the blow-molding fluid when the lower piston 6 has slid vertically upward between the point where it butts against the rim 42 via the ring 32 and the point where it butts against the lower edge 5a of the upper piston 5, the upper piston 5 then still butting and resting against the upper shoulder 10. The pistons (5, 6) are then in the position as depicted in FIG. 6.

It is within the competence of those skilled in the art to adapt the hollow body venting down-time when the hollow body has been blow-molded by a nozzle 15 of the type that makes sealed contact with the mouth and the blow-molding tube 20 has been partially raised in order to vent the blown fluid through the vents 22.

In order then to completely raise the blow-molding tube 20 and place a new hollow body 37 under the blow-molding tube 20, the upper radial port 7 and the intermediate radial port 8 are opened and a fluid is injected into the lower radial port 9 in order thus to cause the upper piston 5 and the lower piston 6 to slide back upward so that the upper piston 5 comes into abutment against the end wall of the actuator 1 and more specifically against the thrust washer 38, and so that the lower piston 6 remains butting and resting against the lower edge 5a of the upper piston 5. The pistons (5, 6) are then in the "raised" position as depicted in FIG. 4.

Figure 7:
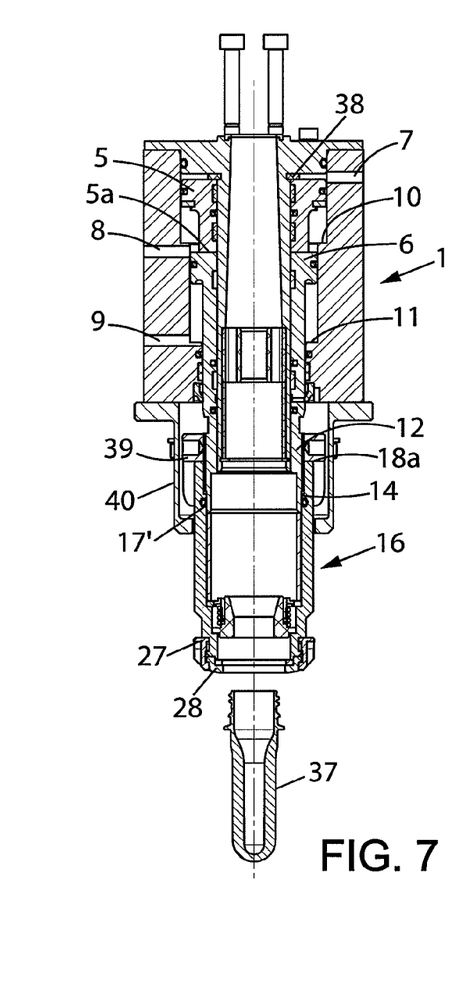
FIGS. 7 and 8 are two schematic sectional views depicting the two successive steps of the blow-molding method using a nozzle actuator associated with a nozzle of the bell type.
Figure 8:
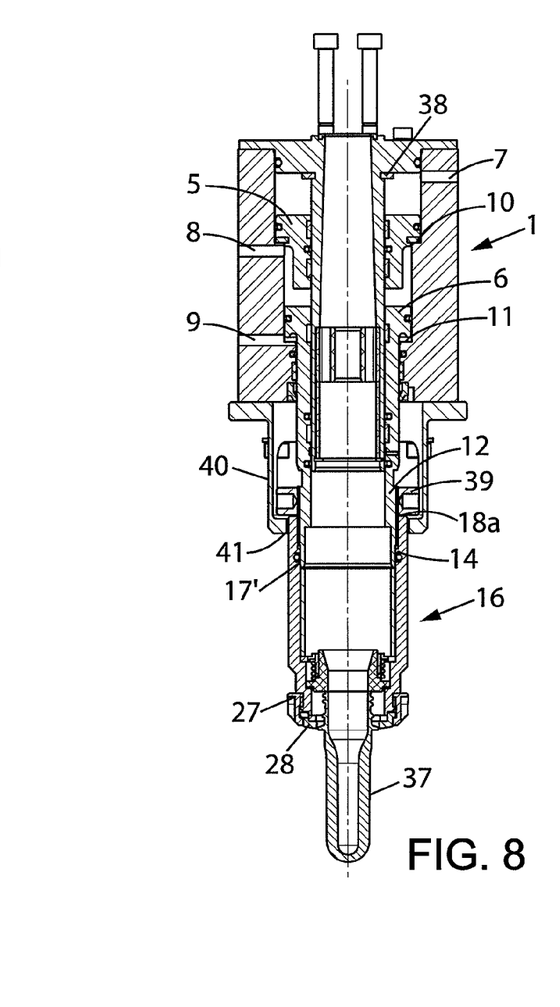

FIGS. 7 and 8 also depict the two successive steps in the operation of blow-molding a hollow body 37 using a nozzle 16 of the bell type.

In the first step and as depicted in FIG. 7, the upper and lower pistons (5, 6) are both in their "raised" position, namely the upper piston 5 is butting against the thrust washer 38 placed in the end wall of the actuator 1 and the lower piston 6 is butting against the lower edge 5a of the upper piston 5.

In order for the lower rim of the cap 27 with the lip seal 28 to bear sealingly against the surface of the mold in which the hollow body 37 is placed, or against a wearing piece incorporated into the surface of the mold, a fluid is injected into the upper radial port 7 to make the two pistons (5, 6) slide first of all simultaneously in a downward movement, the upper piston 5 then coming to rest against the upper shoulder 10, then a fluid is injected into the port 8 to lower the lower piston 6 until it comes into abutment against the surface of the mold via the cap 27 and the lip seal 28. The two pistons (5, 6) are lowered according to the same principle as previously described when the actuator 1 was secured to a nozzle 15 of the type that makes sealed contact with the mouth.

This first operation also causes the guide ring 39 to slide downward in the cap 40, except that here the ring 39 does not come into abutment against the lower rim 42.

However, contrary to that described for the method of operation of a nozzle 15 of the type that makes sealed contact with the mouth, in which the blow-molding tube 20 has to be slid partially in an upward movement back up to allow the blow-molding fluid to be vented through the slots 22 of the vent type following the operation of blow-molding the hollow body 37 in the mold, this step of venting the blow-molding fluid is unnecessary and the pistons (5, 6) are both made simultaneously to move upward and downward. Thus, with a nozzle 16 of the bell type, the pistons (5, 6) shuttle between just two positions, namely a "raised" first position as described in FIG. 7 and a "lowered" position as described in FIG. 8, in which the upper piston 5 rests against the upper shoulder 10 and in which the lower piston 6 rests against the surface of the mold via the cap 27 and the lip seal 28.

Nevertheless, it should be noted that when the pistons (5, 6) are raised back up, once they are both in the lowered abutment position, the step of raising the pistons (5, 6) back up is done in two phases by injecting a fluid into the lower working chamber 9, the intermediate and upper radial ports (7, 8) then being open. The fluid has to be injected at a high enough pressure that it can cause the lower piston 6 to slide until it comes into abutment against the upper piston 5 and then the two pistons (5, 6) to slide back up until the upper piston 5 comes to rest against the thrust washer 38 placed in the end wall of the actuator 1.

The nozzle actuator 1 is connected to fluidic control means of a type known per se (for example, multi-way pneumatic directional control valves) for controlling the double-piston (5, 6) actuator both in an operating mode as described in FIGS. 4 to 6 and in an operating mode as described in FIGS. 7 and 8.

Alternatively, according to another way of operating the pistons (5, 6) when the actuator 1 is associated with a nozzle 16 of the bell type, the upper piston 5 remains pressed against the end wall of the actuator 1 and no fluid is injected through the upper radial port 7. In this case, the lower piston 6 slides between just two positions: a first position in which the lower piston 6 is in contact with the lower edge 5a of the upper piston 5 and a second position in which the lower piston 6 rests against the surface of the mold via the cap 27 and the lip seal 28 after a pressurized fluid has been injected into the intermediate radial port 8 and the lower radial port 9 opened. The lower piston 6 is then raised in a reverse way by injecting pressurized fluid into the lower radial port 9 and opening the intermediate radial port 8.

Thus, according to the invention, it is possible easily and quickly to replace nozzles 16 of the bell type with nozzles 15 of the type that make sealed contact with the mouth, and vice versa, by unscrewing and detaching the nozzles (15, 16) and replacing them with other nozzles (15, 16), because of the screw thread 14 on the tubular part 12 of the lower piston 6 and the screw thread (17, 17') on the nozzles of the type which make sealed contact with the mouth and bell type (15, 16).

Thus, a user wishing to alter the method of operation of a blow-molding installation has only to modify the nozzle (15, 16) rather than also to modify the nozzle actuator 1, the control means remaining identical between control of a nozzle 15 of the type that makes sealed contact with the mouth and control of a nozzle 16 of the bell type.

The invention claimed is:

1. Blow-molding installation for manufacturing thermoplastic hollow bodies by blow-molding or stretch-blow-molding containers in a molding cavity of a mold, this blow-molding installation comprising:

a nozzle actuator comprising at least one moving nozzle piston;

a nozzle able to establish a sealed fluidic connection with the neck of a container placed in the molding cavity; and pneumatic means for operating the actuator between a raised position in which the nozzle is raised above the mold and a blow-molding position in which the nozzle makes a sealed fluidic connection with the neck of a container placed in the molding cavity;

wherein the nozzle actuator is a double-acting actuator with two stages in series equipped with two pistons, these being an upper piston and a lower piston respectively;

wherein the nozzle is fixed removably on the free end of the lower piston; and wherein the pneumatic control means are designed to make said pistons slide according to two operating modes, namely:

a first operating mode used when the nozzle is of the type that makes sealed contact with the mouth of the neck of the container, and a second operating mode used when the nozzle is of the bell type with sealed contact against the surface of the mold in which the container is placed.

2. Blow-molding installation according to claim 1, wherein said actuator, of central axis X-X, comprises an upper piston able to come into abutment against an upper shoulder and a lower piston able to come into abutment against a lower shoulder, the stroke of the lower piston being longer than the stroke of the upper piston.

3. Blow-molding installation according to claim 1, wherein said actuator of central axis X-X comprises an upper piston able to come into abutment against an upper shoulder and a lower piston able to come into abutment against a rim of a cap via a ring surrounding the pin of the lower piston.

4. Blow-molding installation according to claim 1, wherein said actuator of central axis X-X comprises an upper piston able to come into abutment against an upper shoulder and a lower piston able to come into abutment against the surface of the mold.

5. Blow-molding installation according to claim 1, wherein the actuator is in the form of a cylinder having an upper radial port, an intermediate radial port and a lower radial port.

6. Blow-molding installation according to claim 5, wherein said intermediate radial port lies in the same radial plane as an upper shoulder and wherein said lower radial port lies in the same radial plane as a lower shoulder.

7. Blow-molding installation according to claim 1, wherein said nozzle of the type that makes sealed contact with the mouth and said one nozzle of the bell type are fixed to said actuator by screw-thread means consisting of a screw thread provided on said actuator and of a tapped bore provided in said nozzle of the type that makes sealed contact with the mouth and in said nozzle of the bell type.

8. Blow-molding installation according to claim 5, wherein the control means are configured to, in succession:

simultaneously lower the upper and lower pistons until the upper piston comes into abutment against the upper shoulder by injecting a pressurized fluid into the upper radial port;

lower the lower piston by injecting a pressurized fluid into the intermediate radial port;

raise the lower piston until it comes into abutment against the lower edge of the upper piston by injecting a pressurized fluid into the lower radial port, the lower piston remaining resting against the upper shoulder; and simultaneously raise the upper and lower pistons until the upper piston comes to rest against the end wall of said actuator by injecting a pressurized fluid into the lower radial port.

9. Blow-molding installation according to claim 5, wherein, when attaching said actuator from said nozzle of the bell type, the control means are configured to, in succession:

lower the lower piston until it comes into abutment with the surface of the mold by injecting pressurized fluid into the intermediate radial port, the upper piston remaining resting against the end wall of said actuator, and raise the lower piston until it comes into abutment against the lower edge of the upper piston by injecting pressurized fluid into the lower radial port, the upper piston remaining against the end wall of said actuator.

\* \* \* \* \*